(12) United States Patent
Ootsuka et al.

(10) Patent No.: US 7,580,619 B2
(45) Date of Patent: Aug. 25, 2009

(54) OPTICAL ELEMENT, OPTICAL UNIT, AND IMAGE-TAKING APPARATUS

(75) Inventors: Tetsuya Ootsuka, Asaka (JP); Takashi Kato, Minami-Ashigara (JP); Hitoshi Miyano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 488 days.

(21) Appl. No.: 11/362,782

(22) Filed: Feb. 28, 2006

(65) Prior Publication Data

US 2006/0193629 A1 Aug. 31, 2006

(30) Foreign Application Priority Data

Feb. 28, 2005 (JP) ............................. 2005-053155

(51) Int. Cl.
*G03B 17/00* (2006.01)
(52) U.S. Cl. ......................................... 396/55; 396/457
(58) Field of Classification Search .................. 396/55; 348/208.4–208.7
See application file for complete search history.

(56) References Cited

U.S. PATENT DOCUMENTS

| | | | | |
|---|---|---|---|---|
| 5,566,009 | A * | 10/1996 | Yamazaki et al. | 349/86 |
| 7,224,534 | B2 * | 5/2007 | Ootsuka et al. | 359/665 |
| 7,339,715 | B2 * | 3/2008 | Webber et al. | 359/296 |
| 2003/0020958 | A1 * | 1/2003 | Bean et al. | 358/302 |
| 2004/0155846 | A1 * | 8/2004 | Hoffman et al. | 345/87 |
| 2005/0258428 | A1 * | 11/2005 | Wong et al. | 257/72 |

FOREIGN PATENT DOCUMENTS

| | | |
|---|---|---|
| JP | 62-209412 A | 9/1987 |
| JP | 2000-347154 A | 12/2000 |
| JP | 2001-272646 A | 10/2001 |
| JP | 2002-182181 A | 6/2002 |
| JP | 2004-4616 A | 1/2004 |
| JP | 2004-103957 A | 4/2004 |

\* cited by examiner

*Primary Examiner*—W B Perkey
(74) *Attorney, Agent, or Firm*—Sughrue Mion, PLLC (57) ABSTRACT

The present invention provides an optical element, optical unit, and image-taking apparatus which can reduce heat generation in the optical element and accurately control a refractive index profile of the optical element. The optical element has a liquid crystal layer composed of transparent liquid crystal molecules; a first electrode placed along the liquid crystal layer; multiple transparent second electrodes placed along the liquid crystal layer on the opposite side of the liquid crystal layer from the first electrode, with a voltage being applied between the first electrode and each of the multiple transparent second electrodes; and multiple transparent transistors placed along the liquid crystal layer together with the multiple second electrodes to adjust the voltages applied to the multiple second electrodes.

7 Claims, 7 Drawing Sheets

OPTICAL ELEMENT, OPTICAL UNIT, AND IMAGE-TAKING APPARATUS

BACKGROUND OF THE INVENTION

1. Field of the Invention

The present invention relates to an optical element transparent to light, optical unit, and image-taking apparatus which acquires image data by making subject light form an image.

2. Description of the Related Art

Known variable-focal-length lenses include liquid crystal lenses which vary their focal length using electro-optical effect of liquid crystals. For example, Japanese Patent Laid-Open Nos. 2001-272646 and 2004-4616 describe a liquid crystal lens composed of two optically transparent substrates, a liquid crystal layer encapsulated between the two optically transparent substrates, and an electrode which applies an electric field to the liquid crystal layer. With this liquid crystal lens, the orientation of liquid crystal molecules changes with the intensity of the applied electric field, changing the refractive index of the liquid crystal lens and thereby adjusting the focal length of the liquid crystal lens.

Also known is a liquid lens which varies its focal length by changing surface shape of a conductive fluid by application of voltages to the conductive fluid. For example, an article "Philips' Fluid Lenses" (Mar. 3, 2004, Royal Philips Electronics) found at URL <http://www.dpreview.com/news/0403/04030302philipsfluidlens.asp> on Mar. 31, 2004 describes a liquid lens composed of a tube whose inner wall is covered by a water-repellent coating, a water-based conductive liquid and non-conductive oil encapsulated in the tube, and an electrode which applies an electric field to the water-based liquid in the tube. With this liquid lens, when no electric field is applied to the water-based conductive liquid, the water-based liquid is a hemispherical mass and an interface between the water-based liquid and oil is convex. The interface changes its shape from convex to concave according to the intensity of the electric field applied to the water-based conductive liquid. This changes the curvature radius of the lens, allowing the focal length to be changed freely.

If the lens center can be shifted by changing the refractive index and surface shape, the direction of light exiting the lens can be adjusted. Thus, by mounting such a lens on a camera or the like, it is possible to prevent camera shake when shooting a subject. With the lenses described in Japanese Patent Laid-Open Nos. 2001-272646 and 2004-4616 and the article "Philips' Fluid Lenses," in order to shift the lens center, it is conceivable to place multiple electrodes in the lenses, connect a drive line to each of the electrodes to supply voltage, and separately control the voltages applied by the multiple electrodes. However, in order to control the shifting of the lens center finely, it is necessary to install a large number of electrodes and drive lines. Consequently, with a drive method which does not employ transistors, it is difficult to change the refractive index instantly because of the need to apply voltages to different locations in sequence. Furthermore, the voltages concentrated near the lens develop heat in the lens, causing changes in the refractive index of the lens. On the other hand, with a drive method which employs transistors, although it is possible to change the refractive index instantly, typical transistors needs a black matrix to shield light, which reduces the aperture ratio, thereby impairing the functionality of the lens.

Incidentally, the above problems are not limited to lenses, and are true to optical elements such as parallel plates and prisms.

SUMMARY OF THE INVENTION

The present invention has been made in view of the above circumstances and provides an optical element, optical unit, and image-taking apparatus which can reduce heat generation in the optical element and accurately control a refractive index profile of the optical element.

The present invention provides an optical element having:

a liquid crystal layer composed of transparent liquid crystal molecules;

a first electrode placed along the liquid crystal layer;

multiple transparent second electrodes placed along the liquid crystal layer on the opposite side of the liquid crystal layer from the first electrode, with a voltage being applied between the first electrode and each of the multiple transparent second electrodes; and multiple transparent transistors placed along the liquid crystal layer together with the multiple second electrodes to adjust the voltages applied to the multiple second electrodes.

Recently, it has been reported that a transparent transistor has been developed (Japanese Patent Laid-Open No. 2004-10395. The present invention uses such transparent transistors.

With the optical element according to the present invention, when a voltage is applied between the first electrode and each of the multiple second electrodes, an electric field is applied to the liquid crystal layer between the first electrode and the multiple second electrodes, changing the orientation of the liquid crystal molecules and thereby adjusting the refractive index of the optical element. Since multiple transparent transistors are provided to adjust the voltages applied to the multiple second electrodes, the refractive index of the optical element can be adjusted quickly with high accuracy. Also, the multiple transparent transistors can produce voltages to be applied to the respective second electrodes, eliminating the need for voltage lines used to supply voltages to individual second electrodes and thereby avoiding such problems as heat generation caused by a large voltage build-up in the optical element and deviations in the refractive index of the optical element.

In the optical element according to the present invention, preferably the first electrode is transparent.

The use of the transparent first electrode makes it possible to place the first electrode on the optical axis of the optical element, thereby bring the first electrode close to the second electrodes, and thereby adjust the refractive index of the optical element with higher accuracy.

In the optical element according to the present invention, preferably the multiple second electrodes are arranged in a matrix.

A preferred mode of the optical element according to the present invention makes it possible to adjust a refractive index profile with high accuracy.

The present invention provides an optical unit having:

a liquid crystal layer composed of transparent liquid crystal molecules;

a first electrode placed along the liquid crystal layer;

multiple transparent second electrodes placed along the liquid crystal layer on the opposite side of the liquid crystal layer from the first electrode, with a voltage being applied between the first electrode and each of the multiple transparent second electrodes;

multiple transparent transistors placed along the liquid crystal layer together with the multiple second electrodes to adjust the voltages applied to the multiple second electrodes; and a control section which changes orientation of the liquid crystal molecules by applying drive signals to the multiple transistors separately and thereby applying a voltage between the first electrode and each of the multiple second electrodes.

The optical unit according to the present invention can reduce heat generation in the optical element and accurately control a refractive index profile as is the case with the optical element according to the present invention.

Incidentally, only a basic mode of the optical unit according to the present invention is described here, but this is for the purpose of avoiding redundancy, and the optical unit according to the present invention includes various modes corresponding to the various modes of the optical element described earlier in addition to the basic mode described above.

The present invention provides an image-taking apparatus, having:

a liquid crystal layer composed of transparent liquid crystal molecules;

a first electrode placed along the liquid crystal layer;

multiple transparent second electrodes placed along the liquid crystal layer on the opposite side of the liquid crystal layer from the first electrode, with a voltage being applied between the first electrode and each of the multiple transparent second electrodes;

multiple transparent transistors placed along the liquid crystal layer together with the multiple second electrodes to adjust the voltages applied to the multiple second electrodes;

a control section which changes orientation of the liquid crystal molecules by applying drive signals to the multiple transistors separately and thereby applying a voltage between the first electrode and each of the multiple second electrodes; and an image pickup device which generates an image signal of subject light that forms an image on a surface of the image pickup device after passing through the first electrode, the liquid crystal layer, and the second electrodes.

The image pickup device according to the present invention typically means a CCD or CMOS sensor containing light-sensitive elements which receive light and generate a photoelectric signal.

The image-taking apparatus according to the present invention can adjust focal length with high accuracy and obtain taken images of high quality.

Incidentally, only a basic mode of the image-taking apparatus according to the present invention is described here, but this is for the purpose of avoiding redundancy, and the image-taking apparatus according to the present invention includes various modes corresponding to the various modes of the optical element described earlier in addition to the basic mode described above.

The present invention can provide an optical element, optical unit, and image-taking apparatus which can reduce heat generation in the optical element and accurately control a refractive index profile of the optical element.

DETAILED DESCRIPTION OF THE INVENTION

An embodiment of the present invention will be described below with reference to the drawings.

Figure 1:
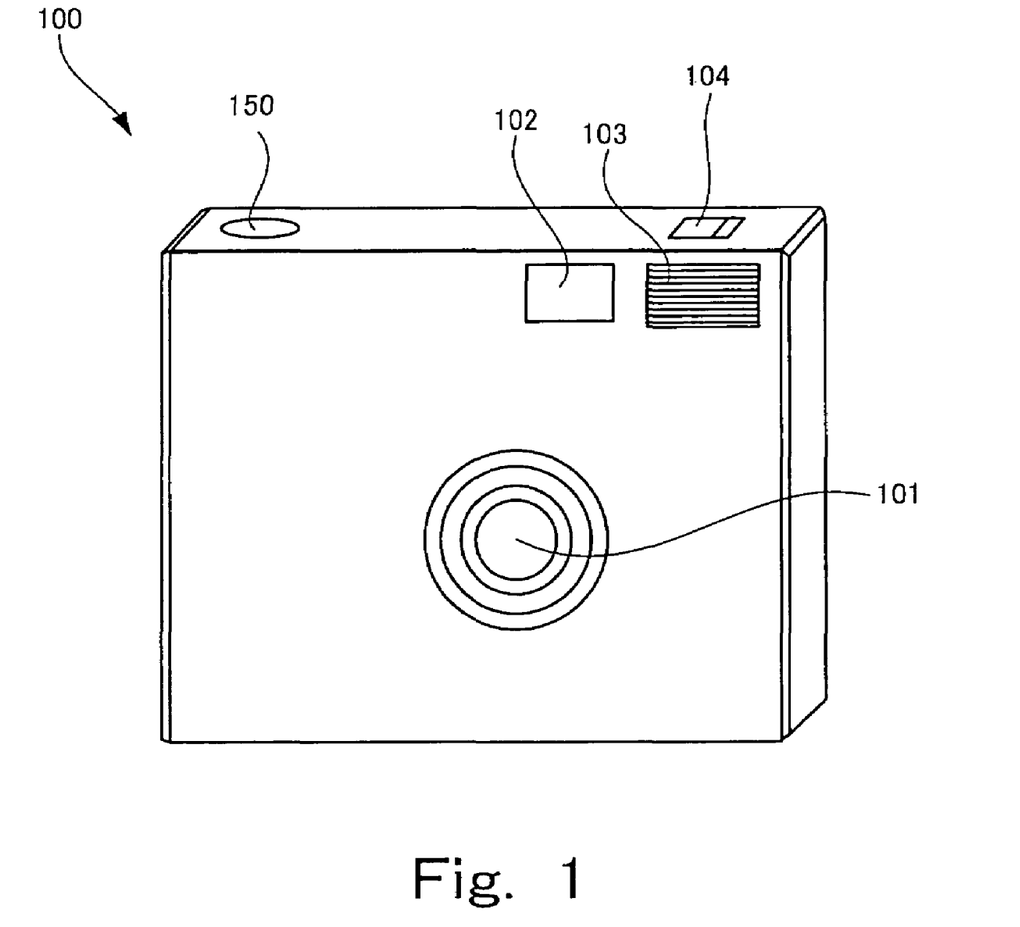
FIG. 1 is an external perspective view of a digital camera according to an embodiment of the present invention, as viewed obliquely from the upper front.

FIG. 1 is an external perspective view of a digital camera according to an embodiment of the present invention, as viewed obliquely from the upper front.

As shown in FIG. 1, at the center in the front face of the digital camera 100, there is a taking lens 101. Also, on an upper front part of the digital camera 100, there are an optical finder's objective window 102 and a fill-flash section 103. Furthermore, on the top face of the digital camera 100, there are a slide-type power switch 104 and a release button 150.

Figure 2:
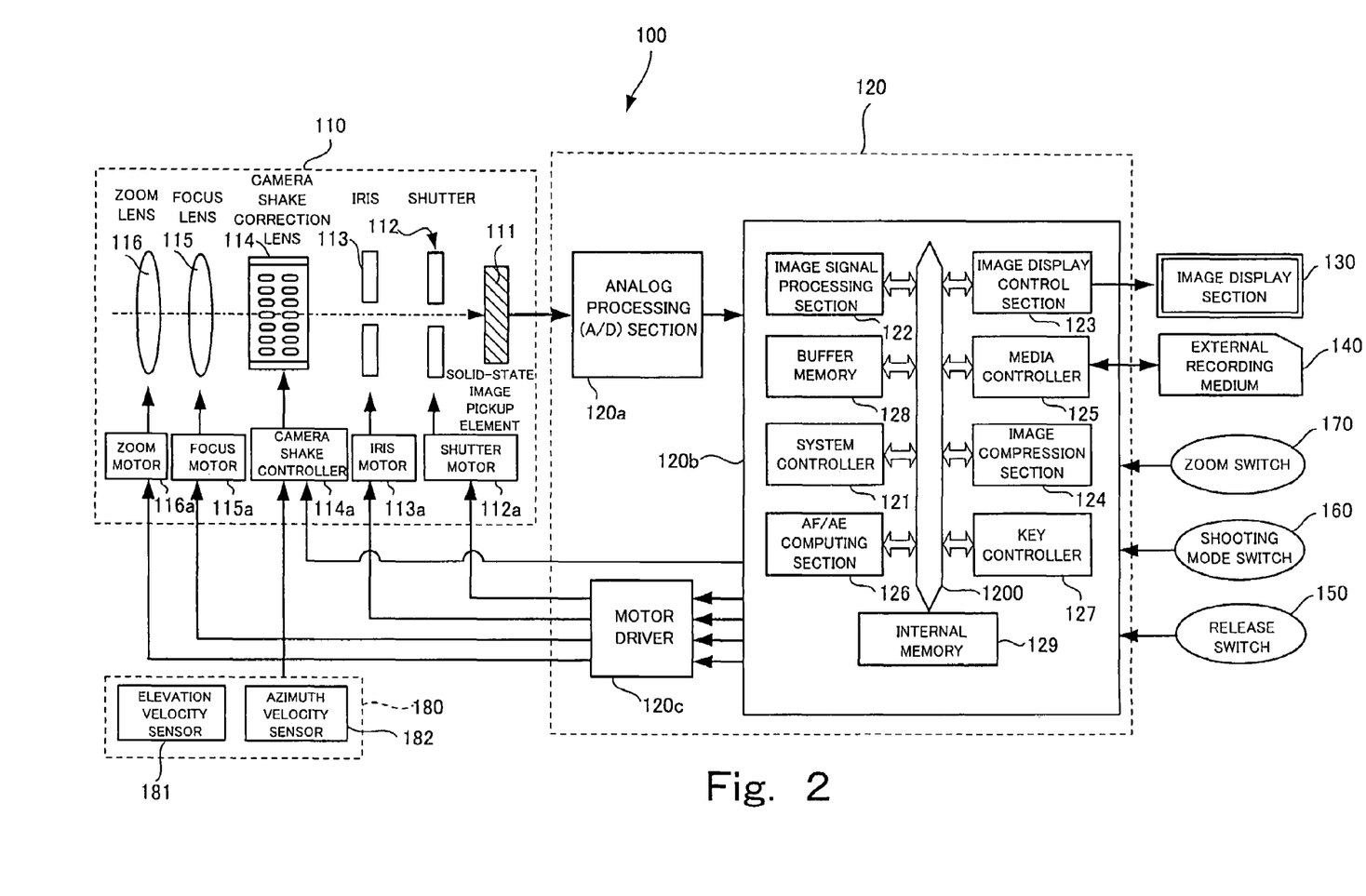
FIG. 2 is a schematic block diagram of the digital camera 100 shown in FIG. 1.

FIG. 2 is a schematic block diagram of the digital camera 100 shown in FIG. 1.

As shown in FIG. 2, the digital camera 100 largely includes a image-taking optical system 110 and a signal processing section 120. Besides, the digital camera 100 is equipped with an image display section 130 for use to display taken images; an external recording medium 140 for use to record image signals obtained by shooting; a zoom switch 170, a shooting mode switch 160, and the release button 150 for use to make the digital camera 100 perform various processes for shooting; and movement sensors 180 which sense movements of the digital camera 100.

First, a configuration of the image-taking optical system 110 will be described with reference to FIG. 2.

Subject light enters the digital camera 100 from the left side of FIG. 2 through a zoom lens 116, focus lens 115, and a camera shake correction lens 114, and passes through an iris 113 which adjusts quantity of the subject light. When a shutter 112 is open, the subject light forms an image on a solid-state image pickup element 111, which is an example of the image pickup device according to the present invention. Essentially, the image-taking optical system contains multiple lenses, at least one of which plays a major role in focus adjustment while relative positions among the lenses determine focal length. In FIG. 2, the lenses concerned with changing the focal length are schematically shown as the zoom lens 116 while the lenses concerned with the focus adjustment are schematically shown as the focus lens 115.

The zoom lens 116, focus lens 115, iris 113, and shutter 112 are driven by a zoom motor 116a, focus motor 115a, iris motor 113a, and shutter motor 112a, respectively. On the other hand, instead of being equipped with a motor, the camera shake correction lens 114 is equipped with a camera shake controller 114a which changes the refractive index of the camera shake correction lens 114. Instructions to operate the zoom motor 116a, focus motor 115a, iris motor 113a, and shutter motor 112a are transmitted from a digital signal processing section 120b of a signal processing section 120 via a motor driver 120c while instructions to operate the camera shake controller 114a is transmitted directly from the digital signal processing section 120b. Also, the camera shake controller 114a receives results of sensing from the movement sensors 180. According to this embodiment, the movement sensors 180 are composed of an elevation velocity sensor 181 which measures angular velocity in the elevation direction (up-and-down direction) of the digital camera 100 and azimuth velocity sensor 182 which measures angular velocity in the azimuth direction (right-and-left direction) of the digital camera 100. Measurement results produced by the elevation velocity sensor 181 and azimuth velocity sensor 182 are transmitted to the camera shake controller 114a. Upon receiving operation instructions from the digital signal processing section 120b, the camera shake controller 114a operates according to the results of sensing from the movement sensors 180.

The zoom lens 116 is moved along the optical axis by the zoom motor 116a. As the zoom lens 116 is moved to a position specified by a signal from the signal processing section 120, the focal length is changed and shooting magnification is determined.

The focus lens 115 implements a TTLAF (Through The Lens Auto Focus) function. The TTLAF function moves the focus lens along the optical axis, makes an AF/AE computing section 126 of the signal processing section 120 detect contrast of an image signal obtained by the solid-state image pickup element 111, and moves the focus lens 115 into focus position which corresponds to the lens position that gives a peak contrast. The TTLAF function makes it possible to take a shot by automatically focusing on the subject which gives the peak contrast.

The camera shake correction lens 114 implements a camera shake correction function to correct the path of subject light so that the subject light will form an image at the correct position on the solid-state image pickup element 111 even if the digital camera 100 moves. According to this embodiment, the camera shake controller 114a corrects the path of the subject light by changing the refractive index of the camera shake correction lens 114. A configuration of the camera shake correction lens 114 as well as a method for changing the refractive index will be described in detail later.

The iris 113 adjusts the quantity of subject light, by being driven based on instructions from the AF/AE computing section 126 of the digital signal processing section 120b.

The above is the configuration of the image-taking optical system 110.

Next, a configuration of the signal processing section 120 will be described. The subject image formed on the solid-state image pickup element 111 in the image-taking optical system is read out as an image signal by an analog processing (A/D) section 120a, which converts the analog signal into a digital signal, which is then supplied to the digital signal processing section 120b. The digital signal processing section 120b is equipped with the system controller 121. Signal processing in the digital signal processing section 120b is performed according to a program which describes operating procedures in the system controller 121. The system controller 121 exchanges data with an image signal processing section 122, image display control section 123, image compression section 124, media controller 125, AF/AE computing section 126, key controller 127, buffer memory 128, and internal memory 129 via a bus 1200. When data is exchanged via the bus 1200, the internal memory 129 serves as a buffer. Data which serve as variables are written as needed into the internal memory 129 according to progress of processes in various parts, and the system controller 121, image signal processing section 122, image display control section 123, image compression section 124, media controller 125, AF/AE computing section 126, and key controller 127 perform appropriate processes with reference to these data. That is, instructions from the system controller 121 are transmitted to the various parts via the bus 1200 to start up the processes in the various parts. The data in the internal memory 129 are updated according to the progress of the processes and referred to by the system controller 121 to control the various parts. In other words, upon power-up, the processes in the various parts are started according to the procedures of the program in the system controller 121. For example, if the release button 150, zoom switch, or shooting mode switch is manipulated, information about the manipulation is transmitted to the system controller 121 via the key controller 127 and a process corresponding to the manipulation is performed according to the procedures of the program in the system controller 121.

When the shutter is released, the image data read out of the solid-state image pickup element are converted from analog signal into digital signal by the analog processing (A/D) section 120a and the digitized image data are stored temporarily in the buffer memory 128 of the digital signal processing section 120b. An RGB signal of the digitized image data is converted by the image signal processing section 122 into a YC signal; which is then compressed into an image file in JPEG format by the image compression section 124. The resulting image file is recorded on the external recording medium 140 via the media controller 125. The image data recorded in the image file are played back in the image display section 130 via the image display control section 123. During this process, the AF/AE computing section performs computations for focus adjustment and exposure adjustment based on the RGB signal. The AF/AE computing section 126 detects contrast in the RGB signal according to subject distance to adjust focus. Based on the detection results, focus is adjusted by the focus lens 115. The AF/AE computing section extracts a luminance signal from the RGB signal and detects field luminance from the luminance signal. Based on the detected field luminance, the iris 113 adjusts exposure so that an appropriate quantity of subject light will fall on the solid-state image pickup element.

The digital camera 100 is basically configured as described above.

The camera shake correction lens 114 will be described in detail below.

Figure 3:
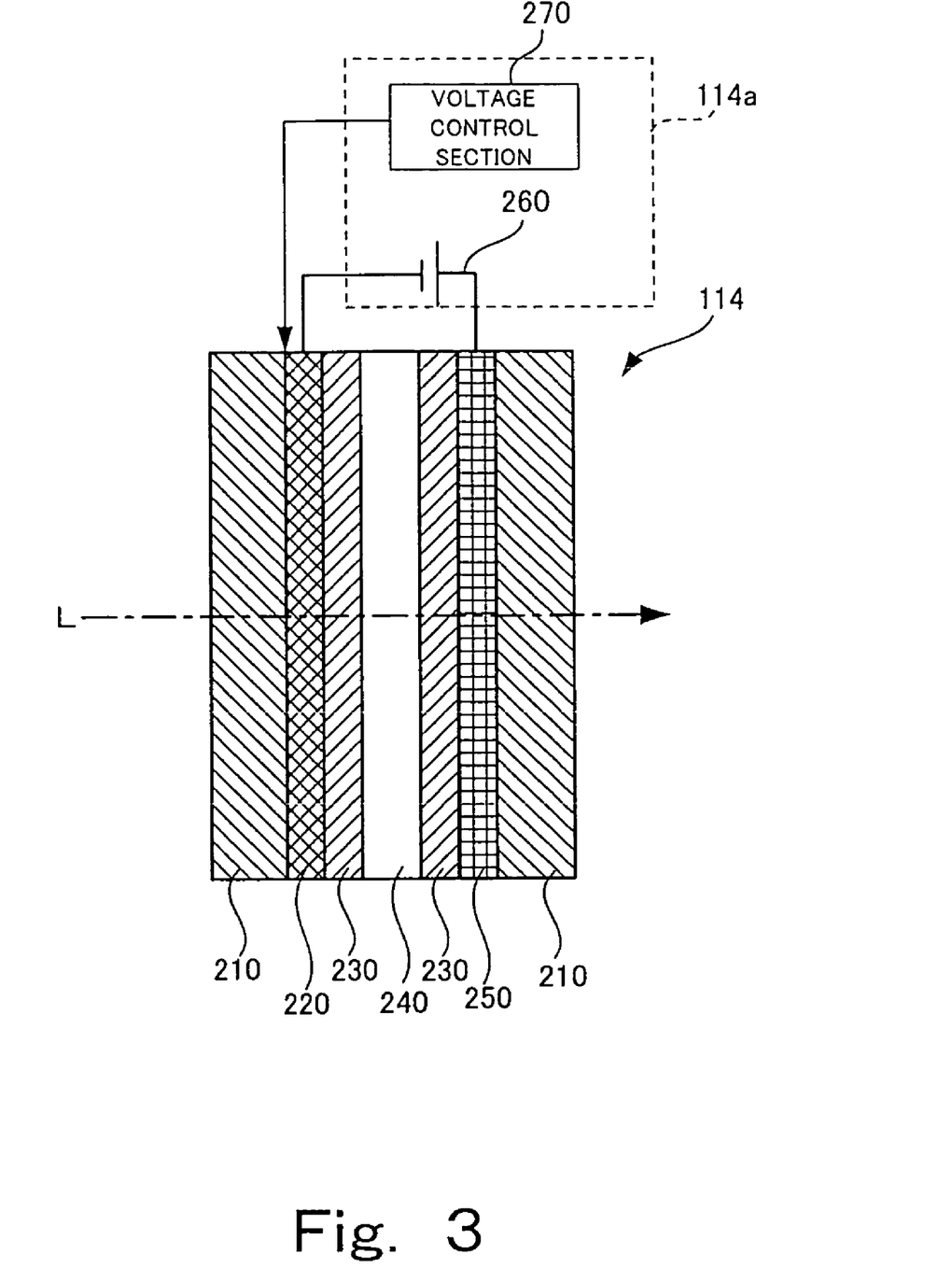
FIG. 3 is a schematic block diagram of a camera shake correction lens.

FIG. 3 is a schematic block diagram of the camera shake correction lens. It is assumed that subject light enters the digital camera 100 from the left side of FIG. 3. The side from which light enters will be designated as the front (left side of FIG. 3) while the side from which light exists will be designated as the rear (right side of FIG. 3).

The camera shake correction lens 114 includes a liquid crystal layer 240 composed of transparent liquid crystal molecules, a transparent electrode layer 220 placed along the front surface of the liquid crystal layer 240, a transparent counter electrode 250 placed along the rear surface of the liquid crystal layer 240, and transparent insulating layers 230 placed between the transparent electrode layer 220 and liquid crystal layer 240 as well as between the liquid crystal layer 240 and counter electrode 250, all of which are sandwiched between two transparent substrates 210. The transparent substrates 210, electrode layer 220, insulating layers 230. (polyimide film), liquid crystal layer 240, and counter electrode 250 are all transparent. The camera shake correction lens 114 has optical transparency along an optical axis L. The camera shake correction lens 114 is connected with the camera shake controller 114a also shown in FIG. 2. The camera shake controller 114a has a power supply 260 which applies a voltage between the electrode layer 220 and counter electrode 250 as well as a voltage control section 270 which controls the voltage applied by the power supply 260 based on the results of sensing from the movement sensors 180 shown in FIG. 1. The liquid crystal layer 240 is an example of the liquid crystal layer according to the present invention while the counter electrode 250 is an example of the first electrode according to the present invention. The camera shake controller 114a is an example of the control section according to the present invention.

Figure 4:
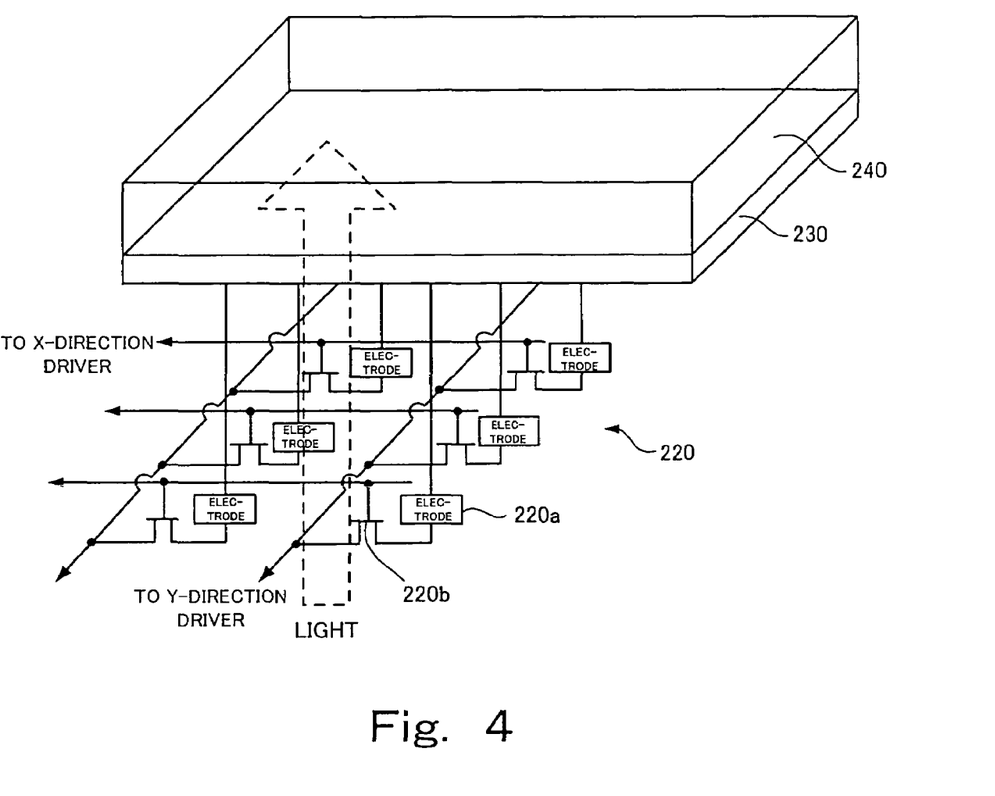
FIG. 4 is a schematic block diagram of an electrode layer 220.

FIG. 4 is a schematic block diagram of the electrode layer 220.

The electrode layer 220 includes multiple drive electrodes 220a placed along the liquid crystal layer 240 via the insulating layers 230 and multiple transparent transistors 220b which adjust the voltages applied to the respective drive electrodes 220a. The drive electrode 220a is an example of the second electrode according to the present invention while the transparent transistor 220b is an example of the transistor according to the present invention.

Figure 5:
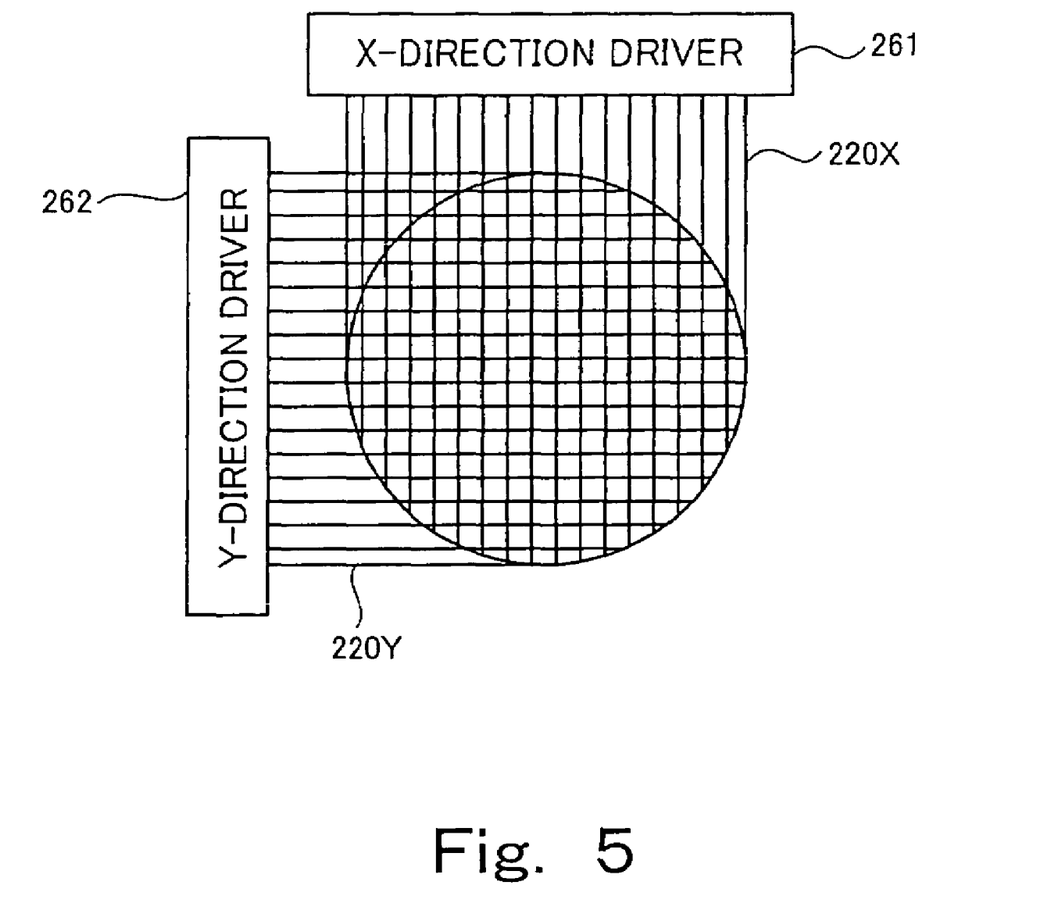
FIG. 5 is a diagram useful for explaining a layout of drive electrodes 220a and transparent transistors 220b.

FIG. 5 is a diagram useful for explaining a layout of the drive electrodes 220a and transparent transistors 220b.

The voltage control section 270 shown in FIG. 3 is equipped with an X-direction driver 261 and Y-direction driver 262 which control voltages supplied to the electrode layer 220. Drive lines 220X and drive lines 220Y which transmit drive signals to the transparent transistors 220b extend from the X-direction driver 261 and Y-direction driver 262, respectively. A pair of a drive electrode 220a and transparent transistor 220b are installed at each intersection of the drive lines 220X and 220Y extending, respectively, from the X-direction driver 261 and Y-direction driver 262 shown in FIG. 5. The circle shown in FIG. 5 indicates the outside diameter of the camera shake correction lens 114 shown in FIG. 3.

Selection of one drive line each in the X and Y directions decides on the transparent transistor located at the intersection. Since multiple transparent transistors are located on each drive line, drive signals are given to the transparent transistors on the same drive line with delay periods. By giving drive signals to the drive lines 220X and 220Y connected to each selected transparent transistor, the X-direction driver 261 and Y-direction driver 262 can separately control the multiple transparent transistors 220b and finely adjust distribution of voltages applied to each of the drive electrodes 220a. Since there is no need to install voltage lines to supply voltages to each of the drive electrodes 220a, it is possible to reduce heat generation in the liquid crystal layer 240.

Next, the liquid crystal layer 240 will be described.

Figure 6:
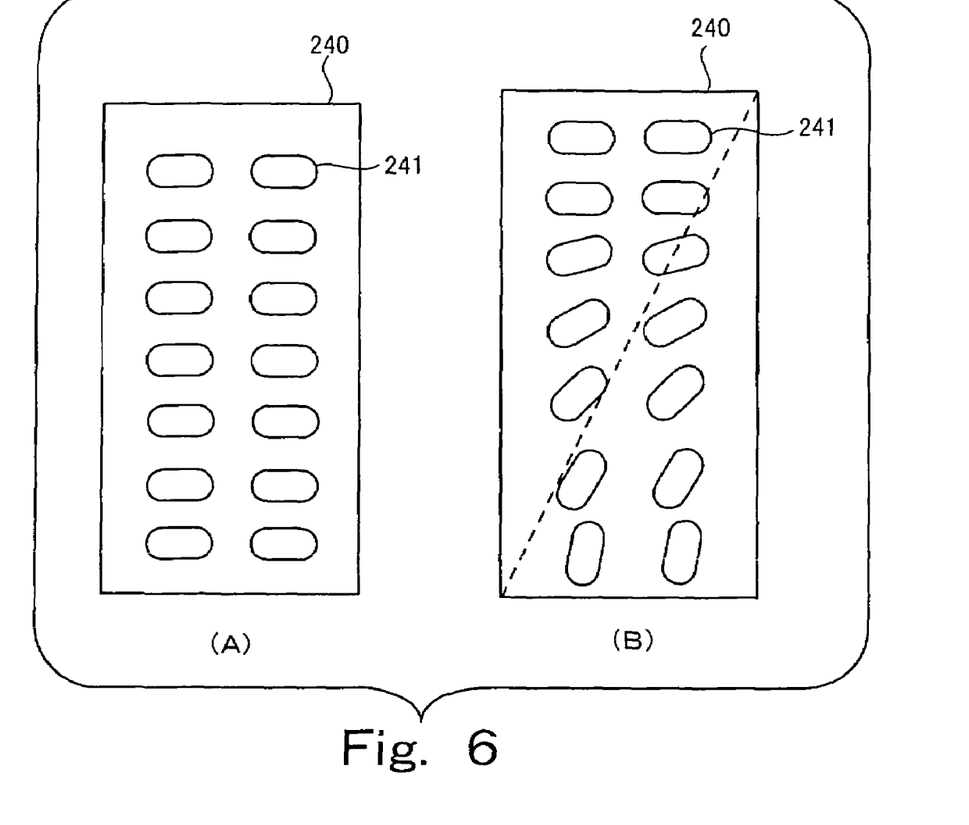
FIG. 6 is a diagram showing a liquid crystal layer 240.

FIG. 6 is a diagram showing the liquid crystal layer 240.

The liquid crystal layer 240 includes transparent liquid crystal molecules 241. The liquid crystal molecules 241 have an elongated shape. Their orientation and refractive index change upon application of an electric field. In this example, when no electric field is applied to the liquid crystal layer 240, the liquid crystal molecules 241 are aligned such that their major axis will be aligned with the optical axis (right-and-left direction in FIG. 6) (this state will be referred to as an OFF state) as shown in Part (A) of FIG. 6 and when an electric field is applied along the optical axis, the liquid crystal molecules 241 tilts from the OFF state. The closer to the OFF state, the smaller the refractive index for light. The larger the tilt from the OFF state, the larger the refractive index for light.

For example, if drive signals for applying successively larger voltages with increasing distance from the top of the figure are given to the multiple transparent transistors 220b by the X-direction driver 261 and Y-direction driver 262 shown in FIG. 5, successively larger voltages are applied between the counter electrode 250 and drive electrodes 220a with increasing distance from the top of the figure. At this time, as shown in Part (B) of FIG. 6, the liquid crystal molecules 241 are tilted more greatly and their refractive index becomes larger with increasing distance from the top, forming such a refractive index profile in the liquid crystal layer 240 as does a wedge-shaped prism indicated by a dotted line.

The camera shake correction lens 114 is configured as above.

The digital camera 100 can be moved when, for example, the user presses the release button 150. In that case, the movement of the digital camera 100 changes the path of the subject light passing through the zoom lens 116 and focus lens 115 shown in FIG. 2. Without camera shake correction, image location on the solid-state image pickup element 111 may be displaced, resulting in blurring of a taken image.

The digital camera 100 according to this embodiment corrects changes in the path of subject light due to movements of the digital camera 100 by varying the orientation of the liquid crystal molecules 241 encapsulated in the liquid crystal layer 240 of the camera shake correction lens 114 and thereby adjusting the refractive index profile.

As the user presses the release button 150 shown in FIG. 1, the camera shake controller 114a acquires angular velocities (elevation velocity and azimuth velocity) in the movement of the digital camera 100 from the movement sensors 180.

The voltage control section 270 of the camera shake controller 114a makes the X-direction driver 261 and Y-direction driver 262 vary voltages at velocities corresponding to the angular velocities acquired from the movement sensors 180. Consequently, the refractive index profile of the camera shake correction lens 114 changes in the up-and-down direction and right-and-left direction, respectively, at velocities corresponding, respectively, to the elevation velocity and azimuth velocity acquired from the movement sensors 180. The X-direction driver 261 and Y-direction driver 262 give drive signals separately to the transparent transistors 220b using the drive lines 220X and 220Y.

The transparent transistors 220b adjust the voltages applied to the respective drive electrodes 220a. When voltages are applied between the drive electrodes 220a and the counter electrode 250, the liquid crystal molecules 241 in the liquid crystal layer 240 are tilted by resulting electric fields, adjusting the refractive index of the camera shake correction lens 114.

Figure 7:
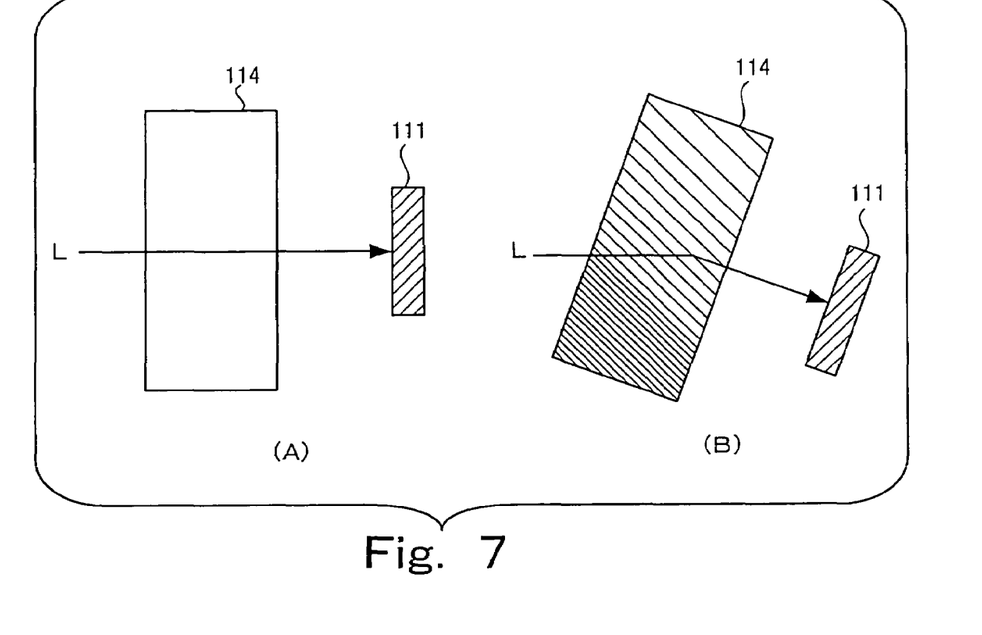
FIG. 7 is a diagram illustrating a change in an optical path made by the camera shake correction lens 114.

FIG. 7 is a diagram illustrating a change in an optical path made by the camera shake correction lens 114.

As shown in Part (A) of FIG. 7, when no voltage is applied to the multiple drive electrodes 220a, the liquid crystal molecules 241 are oriented in the same direction as shown in Part (A) of FIG. 6, and thus the liquid crystal layer 240 of the camera shake correction lens 114 forms a uniform refractive index profile. At this time, light L entering the camera shake correction lens 114 forms an image at the correct position on the solid-state image pickup element 111.

For example, if the front face of the camera 100 looks upward (camera shake in the elevation direction) when the user presses the release button 150, successively larger voltages are applied to the drive electrodes 220a in a downward sequence, causing the liquid crystal molecules to tilt successively more in a downward sequence and thereby forming a refractive index profile such as the one shown in Part (B) of FIG. 7. Consequently, the light L entering the camera shake correction lens 114 is refracted by the liquid crystal molecules 241 to form an image at the correct position on the solid-state image pickup element 111.

In this way, the digital camera 100 according to this embodiment can avoid camera shake reliably and obtain taken images of high quality.

Although in the above embodiment, the optical element and optical unit according to the present invention are used to prevent camera shake, they may be used for a focus lens and zoom lens. For example, when the optical element and optical unit according to the present invention are used for a focus lens and zoom lens, by applying a voltage for implementation of a TTLAF function and voltage for implementation of a camera shake correction function between a first electrode and each of multiple second electrodes, it is possible to implement these functions in a single lens.

Also, although the above embodiment uses only one first electrode according to the present invention, it is alternatively possible to use multiple first electrodes according to the present invention and install multiple transparent transistors to control respective voltages applied to the multiple first electrodes.

Also, although in the above embodiment, the multiple second electrodes according to the present invention are arranged in a matrix, the multiple second electrodes according to the present invention may be arranged, for example, concentrically.

Next, possible forms of various components composing the present invention will be described additionally.

Liquid crystals available for the present invention include, for example, liquid crystal compounds which exhibit a nematic phase or smectic phase. Concrete examples are: azomethine compounds, cyanobiphenyl compounds, cyanophenyl ester, fluorine-substituted phenyl ester, cyclohexane carboxylic acid phenyl ester, fluorine-substituted cyclohexane carboxylic acid phenyl ester, cyanophenyl cyclohexane, fluorine-substituted phenyl cyclohexane, cyano-substituted phenyl pyrimidine, fluorine-substituted phenyl pyrimidine, alkoxy-substituted phenyl pyrimidine, fluorine-substituted alkoxy-substituted phenyl pyrimidine, phenyl dioxane, tolane compounds, fluorine-substituted tolane compounds, alkenyl cyclohexyl benzonitrile, etc.

Available liquid crystal compounds can be found on pp. 154-192 and pp. 715-722 of "Liquid Crystal Device Handbook" (compiled by Committee 142 of Japan Society for the Promotion of Science, published by the Nikkan Kogyo Shimbun, Ltd., 1989). Fluorine-substituted host liquid crystals suited-to drive TFTs may also be used. They include liquid crystals (ZLI-4692, MLC-6267, 6284, 6287, 6288, 6406, 6422, 6423, 6425, 6435, 6437, 7700, 7800, 9000, 9100, 9200, 9300, 10000, etc.) manufactured by Merck & Co. and liquid crystals (LIXON 5036xx, 5037xx, 5039xx, 5040xx, 5041xx, etc.) manufactured by CHISSO PETROCHEMICAL CORPORATION.

The liquid crystals used for the present invention may have either negative or positive dielectric anisotropy. In the case of liquid crystals with positive dielectric anisotropy, the use of a horizontal alignment film makes it possible to arrange liquid crystal molecules horizontally when no voltage is applied, and arrange them vertically when a voltage is applied. In the case of liquid crystals with negative dielectric anisotropy, the use of a vertical alignment film makes it possible to arrange the liquid crystal molecules vertically when no voltage is applied, and arrange them horizontally when a voltage is applied.

To give negative dielectric anisotropy to liquid crystals, a structure is required which increases dielectric anisotropy of the minor axis of the liquid crystal molecules. Such structures are described on pp. 4-9 of "Monthly DISPLAY" (the April 2000 issue) and on pp. 389-396 in Volume 4 of Synlett (1999). Among other things, liquid crystals with fluorinated substituents and with negative dielectric anisotropy are preferable from the viewpoint of voltage retention. Examples include liquid crystals (MLC-6608, 6609, 6610, etc.) manufactured by Merck & Co.

The present invention can also use dual-frequency driven liquid crystals. The use of dual-frequency driven liquid crystals enables reversible orientation changes without using an alignment film.

The dual-frequency driven liquid crystals exhibit positive dielectric anisotropy when a low-frequency electric field is applied to them, and exhibit negative dielectric anisotropy when a high-frequency electric field is applied to them. Detailed description can be found on pp. 189-192 of "Liquid Crystal Device Handbook" compiled by Committee 142 of Japan Society for the Promotion of Science and published by the Nikkan Kogyo Shimbun, Ltd. in 1989.

Dual-frequency driven liquid crystal materials available on a commercial basis include DF-02xx, DF-05xx, FX-1001 and FX-1002 manufactured by CHISSO PETROCHEMICAL CORPORATION and MLC-2048 manufactured by Merck & Co.

The dual-frequency driven liquid crystals used for the present invention may be a mixture of two or more liquid crystal compounds. They may contain liquid crystals which do not show sign reversal in dielectric anisotropy between the low-frequency range and high-frequency range of applied electric field.

Preferably, the frequency range of the electric field applied to the liquid crystals is between 0.1 Hz and 10 MHz. More preferably, it is between 1 Hz and 1 MHz. Here, the low-frequency range is between 0.1 Hz and 100 kHz. Preferably, it is between 1 Hz and 10 kHz. More preferably, it is between 10 Hz and 10 kHz. The high-frequency range is between 100 Hz and 10 MHz. Preferably, it is between 100 Hz and 1 MHz. More preferably, it is between 1 kHz and 1 MHz.

Available substrates for the transparent transistor include glass substrates and film substrates.

A possible method for forming the transparent transistor involves growing a monocrystalline ZnO thin film epitaxially on a substrate by MBE method, pulsed laser deposition method (PLD method), or the like and growing a thin film of a homologous compound expressed by $InMO_3(ZnO)_m$ (where M=In, Fe, Ga, or Al; m is an integer less than 50, but not less than 1) on the ZnO thin film by MBE method, pulsed laser deposition method (PLD method), or the like using sintered polycrystalline bodies of the oxide as targets.

The resulting thin film does not have to be a monocrystalline film, and it may be a polycrystalline film or amorphous film. Finally, it is preferable that the entire thin film is covered with a high-melting point compound such as $Al_2O_3$ and subjected to thermal diffusion at high temperature and normal atmospheric pressure in the presence of ZnO vapor.

$InMO_3(ZnO)_m$ (where M=In, Fe, Ga, or Al; m is an integer less than 50, but not less than 1) and the ZnO film diffuse into each other and react with each other to form $InMO_3(ZnO)_{m'}$ (where M=In, Fe, Ga, or Al; m' is an integer less than 50, but not less than 1) of uniform composition when a right temperature is set, where m' is determined by the film thickness ratio between $InMO_3(ZnO)_m$ (where M=In, Fe, Ga, or Al; m is an integer less than 50, but not less than 1) and the ZnO film. When the thickness of the ZnO film is less than 5 nm and the film thickness of $InMO_3(ZnO)_m$ (where M=In, Fe, Ga, or Al; m is an integer less than 50, but not less than 1) is more than 100 nm, m=m'.

The right temperature is between 800 and 1600 degrees (both inclusive), and more preferably between 1200 and 1500 degrees (both inclusive). At temperatures below 800 degrees, diffusion proceeds slowly, making it impossible to obtain $InMO_3(ZnO)_m$ (where M=In, Fe, Ga, or Al; m is an integer less than 50, but not less than 1) of uniform structure. On the other hand, at temperatures above 1600 degrees, evaporation of ZnO cannot be suppressed, making it impossible to obtain $InMO_3(ZnO)_m$ (where M=In, Fe, Ga, or Al; m is an integer less than 50, but not less than 1) of uniform structure.

The homologous monocrystalline film containing ZnO and obtained by reactive solid-phase epitaxy has a nearly stoichiometric composition and has high insulation performance of 108 W·cm or higher at room temperature. It is suitable for normally-off field-effect transistors.

Homologous monocrystalline thin film composed primarily of the resulting ZnO can be used as an active layer to produce top-gate MIS field-effect transistors.

A gate insulation film as well as a metal film for use as a gate electrode are formed on the homologous monocrystalline thin film composed primarily of the ZnO and grown epitaxially on the substrate.

The most suitable material for the gate insulation film is $Al_2O_3$. The metal film for use as a gate electrode may be made of Au, Ag, Al, Cu or the like. A gate electrode 4 is produced by optical lithography, dry etching, or lift-off process and finally, a source electrode 5 and drain electrode 6 are produced.

Possible types of the field-effect transistor according to the present invention include the top-gate MIS field-effect transistor (MIS-FET), J-FET, etc.

Homologous amorphous thin film composed primarily of ZnO can also be used to produce the top-gate MIS field-effect transistor. The amorphous thin film does not need epitaxial growth, and thus epitaxial growth and high temperature annealing processes of ZnO can be eliminated. This makes it possible to mount the gate electrode between the substrate and film, and thus produce a bottom-gate MIS field-effect transistor.

EXAMPLES

The transparent transistor according to the present invention will be described in detail below with examples.

Example 1

Producing a monocrystalline thin film of $InGaO_3(ZnO)_5$

A 2 nm-thick ZnO thin film is grown epitaxially on a monocrystalline silicon substrate by PLD method at a substrate temperature of 700 degrees. Next, the substrate is cooled to room temperature, and a 150 nm-thick polycrystalline thin film of $InGaO_3(ZnO)_5$ is deposited on the epitaxial thin film of ZnO by PLD method. The two-layer film thus produced is removed into the atmosphere, subjected to thermal diffusion in the atmosphere at 1400 degrees for 30 minutes using an electric furnace, and then cooled to room temperature.

Example 2

Producing a MISFET

A top-gate MISFET is produced by photolithography. Au is used for the source and drain electrodes and amorphous $Al_2O_3$ is used for the gate insulation film. The channel length and channel width are 0.05 mm and 0.2 mm, respectively.

What is claimed is:

1. An image-taking apparatus, comprising:
   a liquid crystal layer composed of transparent liquid crystal molecules;
   a first electrode placed along the liquid crystal layer;
   a plurality of transparent second electrodes placed along the liquid crystal layer on the opposite side of the liquid crystal layer from the first electrode, with a voltage being applied between the first electrode and each of the plurality of transparent second electrodes;
   a plurality of transparent transistors placed along the liquid crystal layer together with the plurality of second electrodes to adjust the voltages applied to the plurality of second electrodes;
   a control section which changes orientation of the liquid crystal molecules by applying drive signals to the plurality of transistors separately and thereby applying a voltage between the first electrode and each of the plurality of second electrodes;
   an image pickup device which generates an image signal of subject light that forms an image on a surface of the image pickup device after passing through the first electrode, the liquid crystal layer, and the second electrodes; and
   at least one movement sensor,
   wherein the control section applies drive signals to the plurality of transistors based on an output of the at least one movement sensor.

2. The image-taking apparatus of claim 1, wherein the voltages applied between the first electrode and each of the plurality of second electrodes change a refractive index profile of the liquid crystal layer.

3. The image-taking apparatus of claim 1, wherein the voltages applied between the first electrode and each of the plurality of second electrodes may each be varied among at least three states with each of the at least three states corresponding to a different refractive index of the optical element.

4. The image-taking apparatus of claim 1, wherein the voltages applied between the first electrode and each of the plurality of second electrodes may each be varied among at least three states with each of the at least three states corresponding to a different refractive index of the optical element.

5. The image-taking apparatus of claim 1, wherein:
   the output of the at least one movement sensor comprises a measurement of an angular velocity of the image-taking apparatus.

6. The image-taking apparatus of claim 1, wherein:
   the plurality of transparent second electrodes are arranged concentrically.

7. The image-taking apparatus of claim 1, wherein:
   the image pickup device is opaque.

* * * * *